March 7, 1939.　　　　W. W. SLOANE　　　　2,149,472
MOTOR CONTROL SYSTEM
Filed July 14, 1937
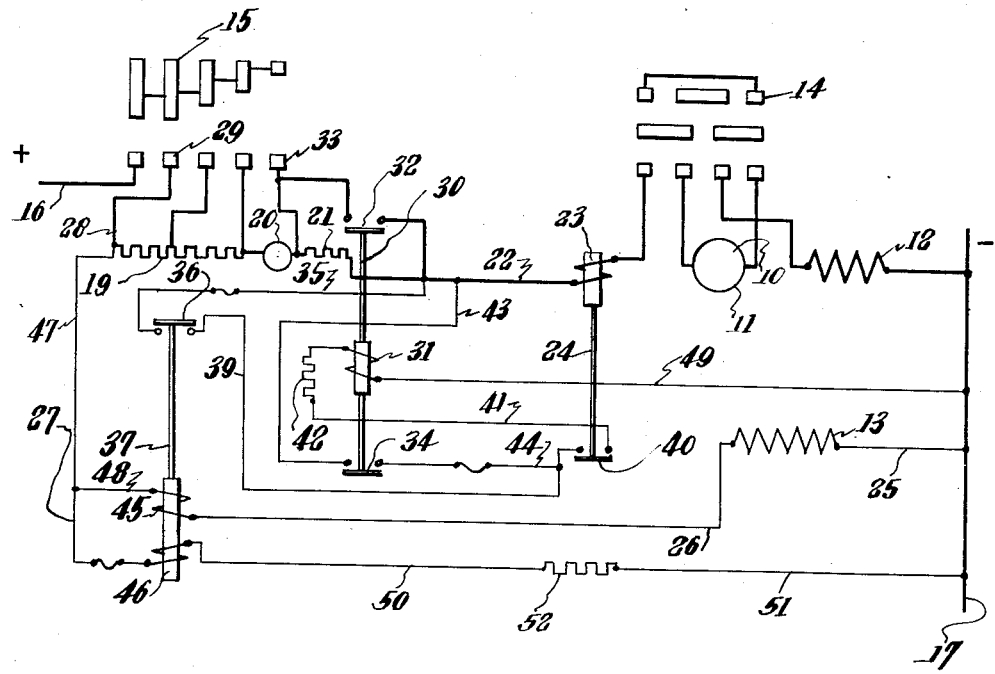
Inventor
William W. Sloane
Clarence F. Poole
Attorney Patented Mar. 7, 1939

2,149,472

UNITED STATES PATENT OFFICE 2,149,472

MOTOR CONTROL SYSTEM

William W. Sloane, Chicago, Ill., assignor to Goodman Manufacturing Company, Chicago, Ill., a corporation of Illinois Application July 14, 1937, Serial No. 153,618

15 Claims. (Cl. 172—179)

This invention relates to improvements in motor control systems and more particularly to a combination of manual and automatic control particularly adapted for use with equipment in mines underground, which is designed to prevent too rapid acceleration of the motor and also to provide protection for the motor in case of a temporary power failure where the power goes off and the motor stops and power is then restored to the circuit without the manual controller being thrown to the "off" position.

Where motors used on mobile mine equipment such as mining or loading machines, have been operated underground, current has usually been supplied to the motor through a bare trolley line and rail by connecting one conductor to the rail and the other to the trolley line, as by hanging a trolley hook or nip on the bare wire. This hook is frequently removed from the trolley line either accidentally or intentionally and when replaced the motor is started directly across the line unless the controller has first been turned to an "off" position.

One of the objects of my invention is to remedy this difficulty by providing a combination of manual and automatic control for a motor which safeguards against too rapid acceleration in case the manual controller is thrown on too fast which may also be used manually for speed control of the motor or for manually controlled acceleration of the motor.

Another object of my invention is to provide such a control which will operate automatically in case of power failure and upon its return will insert resistance in the motor circuit and then automatically cut it out as the motor picks up speed and accelerates to the point where the manual controller was previously set.

Another object of my invention is to provide a control circuit for controlling the cutting in or out of resistance to the motor, which circuit is operable due to the induced voltage caused by the transformer effect between the series and shunt field coils of the motor.

Still another object of my invention is to so arrange the circuit that, when the motor is starting, a portion of the starting rheostat cannot be shorted out manually but is controlled entirely by the current in the shunt field, and is shorted out only after the shunt field current has reached its maximum value.

My invention may best be understood with reference to the accompanying drawing which shows a schematic wiring diagram illustrating one form in which my invention may be embodied.

In the drawing, a motor generally designated by reference character 10 is shown which includes an armature 11, a series field 12, and a shunt field 13. The direction of flow of current through said armature, and thus the direction of rotation of said motor, is controlled by means of a reverse drum 14 in the usual manner. Manual starting of said motor is controlled by means of a controller 15, herein shown as being of the ordinary drum type, and not herein shown or described in detail since it is no portion of my present invention.

Power is supplied to the motor from main line positive and negative conductors 16 and 17, respectively, which may be connected to the trolley and rail by means of trolley hooks or nips, or clamps or any other suitable readily detachable connecting means.

The main line circuit from the positive conductor 16 includes a resistance 19 which may be cut out of the circuit step by step by rotation of the drum of the controller 15 in the usual manner, a blow-out coil 20 to blow out the arc between the contacts of said controller as the circuit between respective of said contacts is broken, and a resistance 21 connected in series with said motor. A conductor 22 leads from said resistance to an operating coil 23 of a relay 24, the contacts 40 of which relay are adapted to make and break a control circuit upon failure of the current supply to said motor. From said relay operating coil, current passes through the reverse drum 14 and armature and series coils of said motor to the negative conductor 17.

The shunt field 13 receives its energy from positive line 16, controller 15, contact finger 29, conductors 28, 47, and 48, operating coil 45 of relay 37 and conductor 26. Current thus passes through said circuit and shunt field through conductor 25 to negative conductor 17. Energy to said shunt field is entirely disconnected from the positive line 16 when the manual controller 15 is in an open position due to the deenergizing of the contact finger 29 of the controller 15.

When the positive and negative conductors 16 and 17 are connected to the source of power supply, and the resistance 19 is cut out from the motor 10 step by step by the controller 15 in the usual manner, the resistance 21 is left in series with the motor circuit. Said last-named resistance is cut from the motor circuit by means of a contactor 30. Said contactor is provided wth an operating coil 31, main line contacts 32 for closing the circuit from a contact segment 33 on the controller 15 to the conductor 22 and thus bridging the circuit from said controller to said conductor and shorting the resistance 21 from the motor circuit. Said contactor is also provided with control circuit contacts 34 which close when the contacts 32 close and close a circuit from the conductor 22 to the coil 31 for said contactor when the relay 24 is closed.

The control circuit for operating the contactor 30 includes a conductor 35 connected from the conductor 22 to contacts 36 of relay 37. A conductor 39 connects the contacts 36 to contacts 40 of the relay 24. From said contacts current passes through a conductor 41, through a protective resistance 42 for the contactor coil 31, and through said coil and the conductor 49, to the negative line 17. Thus, when the contacts 36 and 40 are closed and the main line circuit is connected to the source of power, the coil 31 of the contactor 30 will be energized which will close the contacts 32 and 34 of said contactor. When the control circuit contacts 34 of said contactor are closed, current may pass from the conductor 22 through conductor 43 to and through contacts 34 of the contactor 30, a conductor 44, contacts 40 of the relay 24, and through the conductor 41 and resistor 42 to and through the coil 31 of the contactor 30 through conductor 49 and to the negative line 17, for holding said last-named contactor in a closed position during running of the motor. Whenever the circuit to the main line is broken, the contactor 30 will drop out which will place the resistance 21 in series with the motor so that the motor must be started through said resistance, even though the controller 15 be turned to an "on" position.

Referring now in particular to the relay 37 and the novel means for controlling opening and closing of said relay, said relay is provided with a pair of coils 45 and 46 herein shown as being wound on the same spool. These coils are identical but are wound in opposite directions so as to normally neutralize each other and hold said relay in a closed position during normal operation of the motor. The coil 46 of said relay is connected between the conductor 27 and the main line negative conductor 17 and has a protective resistor 52 connected in series with it which resistance is so adjusted that the current in coil 46 is exactly the same as the field current which flows through coil 45. The coil 45 is connected in the conductor 26 in series with the shunt field 13.

The purpose of the two coils wound on the same spool of the relay 37 is as follows: When the manual controller 15 is closed so that positive conductor 16 is electrically connected to finger 29, current will flow from finger 29 through conductor 28, conductor 47, conductor 27, operating coil 46 of relay 37, conductor 50, resistance 52, conductor 51, to negative line 17. At the same instant the controller 15 closes, there will be a heavy surge of current through the armature of motor 10 and its series field 12, this current flowing from finger 29 through conductor 28, resistance 19, blow-out coil 20, resistance 21, conductor 22, operating coil 23 of relay 24, reverse drum 14, armature 11, and series field 12, to negative conductor 17. This heavy surge of current through series field 12 starts to build up a flux in the motor field circuit. The building up of this flux induces a voltage in the shunt field, which voltage opposes the building up of said flux. This is the same action which takes place between the primary and secondary coils of a transformer and we may refer to this action here as a transformer action. The induced voltage in the shunt field circuit at the instant of the closing of controller 15 is great enough to cause current to flow from negative conductor 17 through conductor 25, shunt field 13, conductor 26, operating coil 45 of relay 37, conductor 48, conductor 47, resistance 19, and back through the armature of the motor. As was stated before, coils 45 and 46 of relay 37 are wound on the same spool and in opposite directions. We now find, however, that the current flows through coil 46 in one direction while it flows through coil 45 in the opposite direction. This action will make the combined effect of these two coils accumulative and will cause relay 37 to operate and open its contacts 36. The same time that relay 37 is operating, we find that the surge of current through motor 10 was passing through operating coil 23 of relay 24 which causes relay 24 to operate and close its contacts 40. At this instant, with relays 24 and 37 in the positions as just indicated, there is no available source of power to operating coil 31 of contactor 30. Therefore, contactor 30 remains in an open position causing resistance 21 to remain in the armature circuit of motor 10. After the current flows through motor 10 for a short interval of time, the magnetic flux of the motor field circuit will approach a temporary maximum value. As this happens the induced voltage in the shunt winding will diminish to zero. The potential on the positive line will then overcome the diminishing induced voltage in the shunt field which was caused by the transformer action and there will be a reversal of the flow of current through said field. This current flows from finger 29 of controller 15, through conductors 28, 47, and 48, through coil 45 of relay 37, conductor 26, shunt field 13, conductor 25, to the negative conductor 17. We now find that after the magnetic flux in the motor circuit has reached its maximum value due to the accumulative action of the series field winding 12 and shunt field winding 13 that the current flowing through shunt field winding 13 will attain its normal operating value. As has been previously stated, resistance 52 in series with operating coil 46 of relay 37 was so adjusted that the amount of current flowing through coil 46 would be exactly the same value as the current flowing through the shunt field when the shunt field current was at its maximum value. Since the shunt field current must pass through coil 45 of relay 37, we find that the current is flowing through coil 46 of relay 37 in one direction, and an equal amount of current flowing through coil 45 of this same relay in the opposite direction. Thus the windings of these two coils neutralize each other causing the armature of relay 37 to drop and close its contacts 36.

The closing of contacts 36 will now complete a circuit through the operating coil 31 of contactor 30 as follows: From finger 29 of controller 15 current will flow through resistance 19, blow-out coil 20, resistance 21, conductor 35, contacts 36 of relay 37, conductor 39, contacts 40 of relay 24, conductor 41, protective resistance 42, operating coil 31 of contactor 30, conductor 49, to the negative conductor 17. This causes contactor 30 to operate which in so doing closes its main line contacts 32, thus throwing a short circuit around resistance 21. At the same time, said contactor 30 closes its control contacts 34, thus shorting out contacts 36 of relay 37. It may now be seen that any further fluctuation in the motor current which might tend to cause transformer action in shunt field 13 and thus unbalance the current through coils 46 and 45 of relay 37 and cause relay 37 to operate, will not operate contactor 30.

Let us now consider another case with controller 15 thrown to its full running position with resistance 19 and blow-out coil 20 shorted out of the circuit by said controller. This position represents the full "on" running position of the controller. While said controller 15 is in this position it is a common occurrence in mine service to have a temporary power failure, or the machine which is driven by motor 10 may be tramming on the rails and the operator may remove his nips from the trolley wire, thus deenergizing positive conductor 16. After coasting for a considerable distance or perhaps after the motor has slowed down to a complete stop, power may again be thrown onto positive conductor 16 while controller 15 is still in its full running position. When this happens resistance 21 will be in the armature circuit of motor 10 thus protecting the motor from a destructive flow of current before the armature starts to revolve. The same transformer action will take place between the series and shunt fields as was described before, relays 37 and 24 will operate in the same manner, and protective resistance 21 will not be cut out of the armature circuit until the current through shunt field 13 has been built up to a maximum value, thus causing coils 45 and 46 of relay 37 to neutralize each other. At this time contacts 36 of relay 37 will close and in so doing will complete the circuit through the operating coil 31 and contactor 30, causing the resistance 21 to be shorted out of the armature circuit.

When there is a power failure, or when the operator removes his nips from the power line while the motor 10 is running, said motor will attempt to generate a potential which if permitted to continue to generate would be of sufficient value to hold contactor 30 in its closed position. Relay 24, however, is inserted in the circuit to prevent this from happening. The instant that power is disconnected from the positive line 16 there will be no more current flowing through conductor 22 and operating coil 23 of relay 24 into the motor. The relay 24 will thus fall open, and open its control circuit contacts 40. Control circuit contacts 40 of relay 24 are in the circuit of operating coil 31 of contactor 30. The contactor 30 thus drops out immediately after the opening of contacts 40 of relay 24, and contactor 30 cannot again be closed until operating coil 23 of relay 24 is energized and its control circuit contacts 40 again close. This makes certain that resistance 21 will always be cut into the armature circuit upon failure of power to flow through the motor due to any cause, and said resistance will remain in the armature circuit until after power has been restored and the shunt field 13 of motor 10 has been built up to its maximum value.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a motor control system, the combination of a source of power, a motor including an armature and shunt and series field windings, a main line circuit leading from said source of power to said motor and including a positive and negative conductor, a resistance in said circuit, a control circuit adapted to automatically cut said resistance into or out of said main line circuit, and a relay in said control circuit, operable due to the transformer effect between said series and shunt fields to hold said resistance into the circuit to said motor until said motor has gained the required speed and the current flowing through said shunt field has reached a maximum value.

2. In a motor control system, the combination of a source of power, a motor including an armature and shunt and series field windings, a main line circuit leading from said source of power to said motor and including a positive and negative conductor, a resistance in said circuit, a control circuit adapted to automatically cut said resistance into or out of the circuit to said motor and means for breaking said control circuit upon breakage of the power circuit to said motor and cutting said resistance into said motor circuit when said circuit has again been made and the current flowing through said shunt field has reached a maximum value including a relay operable due to the transformer effect between said series and shunt fields, said relay having two oppositely wound coils of substantially equal field strength, one of which is in the circuit for said shunt field.

3. In a motor control system, the combination of a source of power, a motor including an armature and shunt and series field windings, a main line circuit leading from said source of power to said motor and including a positive and negative conductor, a resistance in said circuit, a control circuit adapted to automatically cut said resistance into or out of the motor circuit and including means for breaking said control circuit and cutting said resistance into said main line circuit and other means to prevent regenerative voltage of said motor from making said control circuit and connecting said resistance into said motor circuit and to hold said resistance into said main line circuit until the voltage in said shunt field reaches a maximum value including a relay operable due to the transformer effect between said series and shunt field windings.

4. In a motor control system, the combination of a source of power, a motor including an armature and shunt and series field windings, a main line circuit leading from said source of power to said motor and including a positive and negative conductor, a resistance in said circuit, a control circuit adapted to automatically cut said resistance into or out of the motor circuit and including means for breaking said control circuit and cutting said resistance into said main line circuit and other means to prevent regenerative voltage of said motor from making said control circuit and connecting said resistance into said motor circuit and to hold said resistance into said main line circuit until the voltage in said shunt field reaches a maximum value including a relay operable due to the transformer effect between said series and shunt fields having two opposing coils of substantially the same strength, one of which is in series with said shunt field and the other of which is in said control circuit.

5. In a motor control system, the combination of a source of power, a motor including an armature and shunt and series field windings, a main line circuit leading from said source of power to said motor and including a positive and negative conductor, a resistance in said circuit, a control circuit adapted to automatically cut said resistance into or out of the motor circuit and including means for breaking said control circuit and cutting said resistance into said main line circuit and other means to prevent regenerative voltage of said motor from making said control circuit and connecting said resistance into said motor circuit and to hold said resistance into said main line circuit until the voltage in said shunt field reaches a maximum value including a relay operable due to the transformer effect between said series and shunt fields having two opposing coils of substantially the same field strength wound on the same core, one of which coils is in series with said shunt field and the other of which is in said control circuit.

6. In a motor control system, the combination of a source of power, a motor including an armature and shunt and series field windings, a main line circuit leading from said source of power to said motor and including a positive and negative conductor, a resistance in said circuit, a control circuit adapted to automatically cut said resistance into or out of the motor circuit and including means for breaking said control circuit and cutting said resistance into said main line circuit and other means to prevent regenerative voltage of said motor from making said control circuit and connecting said resistance into said motor circuit and to hold said resistance into said main line circuit until the voltage in said shunt field reaches a maximum value including a relay operable due to the transformer effect between said series and shunt fields having two opposing coils of substantially the same field strength wound on the same core, one of which coils is in series with said shunt field and the other of which is in said control circuit, and a resistance in series with said last-named coil to cause the amount of current flowing through said coil to be the same as the current flowing through said shunt field when said shunt field current is at its maximum value.

7. In a motor control system, the combination with a source of power, a motor, a main line circuit leading from said source of power to said motor, a resistance, manually operable means for connecting said motor to the source of current supply through said resistance, another resistance, and a control circuit for automatically cutting said last-named resistance out of the circuit for said motor when said motor reaches the required speed, and cutting said last-named resistance into said motor circuit upon breakage of the power circuit to said motor including a contactor having main line contacts adapted to cut said resistance out of said motor circuit, and a pair of relays for opening said control circuit and causing said contactor to open to throw said last-named resistance into said motor circuit including a relay having an operating coil in the main line circuit and adapted to break the circuit to the operating coil of said contactor, and another relay having an operating coil in said control circuit and adapted to break said control circuit and prevent regenerative voltage of said motor from closing said contactor and make said control circuit only after said motor has attained the required speed.

8. In a motor control system, the combination with a source of power, a motor, a main line circuit leading from said source of power to said motor including positive and negative conductors, a resistance, manually operable means for connecting said motor to the source of current supply through said resistance and cutting out a portion of said resistance from the motor circuit, and a control circuit for automatically cutting the remainder of said resistance from the circuit to said motor when said motor reaches the required speed, and cutting said remainder of said resistance into said motor circuit upon breakage of the power circuit to said motor including a contactor having main line contacts adapted to cut said remainder of said resistance out of said motor circuit, said contactor having its operating coil in said control circuit, and a pair of relays adapted to make or break said control circuit and control operation of said contactor, one of said relays having an operating coil in said main line circuit in series with said motor, the other of said relays having an operating coil in said control circuit and adapted to open due to the transformer effect produced by the field coils of said motor.

9. In a motor control system, the combination of a source of power, a motor including an armature and series and shunt field windings, a main line circuit leading from said source of power to said motor, a resistance, a manually operable controller for connecting said motor to the source of power supply through said resistance, a control circuit for automatically cutting the last step of said resistance from the circuit to said motor and cutting said resistance into said motor circuit upon breakage of the power circuit to said motor including a contactor having its contacts in said main line circuit and adapted to cut said resistance into or out of the motor circuit and having its operating coil in said control circuit, and means for breaking the control circuit to said contactor and inserting said resistance into the motor circuit upon breaking of the main line circuit comprising a relay having its operating coil in said main line circuit in series with said motor and adapted to break said control circuit, and another relay having two opposing coils of substantially equal field strength, one of which coils is in series with said shunt field, said coils being so arranged that the transformer effect between said series and shunt fields will cause current to flow through said coil in series with said shunt field in a direction opposite to its normal direction of flow thus causing both of said coils to operate said relay.

10. In a motor control system, a motor including an armature and shunt and series field windings, a main line circuit leading to said motor including a positive and negative conductor, a resistance in said circuit, a manually operable controller for cutting a part of said resistance from said circuit, and an automatic control circuit for cutting the rest of said resistance from said motor circuit when the shunt field current has reached its maximum value, said control circuit including a relay for breaking said control circuit upon breakage of the power circuit to said motor, and another relay operable due to the transformer effect between said series and shunt fields to hold said remainder of said resistance into the motor circuit until said motor has gained the required speed and the current flowing through said shunt field has reached a maximum value.

11. In a motor control system, a motor including an armature and shunt and series field windings, a main line circuit leading to said motor including a positive and negative conductor, a resistance in said circuit, a manually operable controller for cutting a part of said resistance from said circuit, and an automatic control circuit for cutting the rest of said resistance from said motor circuit when the shunt field current has reached its maximum value, said control circuit including a relay for breaking said control circuit upon breakage of the power circuit to said motor, and another relay operable due to the transformer effect between said series and shunt fields to hold said remainder of said resistance into the motor circuit until said motor has gained the required speed and the current flowing through said shunt field has reached a maximum value, said relay having two opposing coils of substantially the same field strength, one of which is in the circuit for said shunt field and the other of which is in said control circuit.

12. In a motor control system, a motor including an armature and shunt and series field windings, a main line circuit leading to said motor including a positive and negative conductor, a resistance in said circuit, a manually operable controller for cutting a part of said resistance from said circuit, and an automatic control circuit for cutting the rest of said resistance from said motor circuit when the shunt field current has reached its maximum value, said control circuit including a relay for breaking said control circuit upon breakage of the power circuit to said motor, and another relay operable due to the transformer effect between said series and shunt fields to hold said remainder of said resistance into the motor circuit until said motor has gained the required speed and the current flowing through said shunt field has reached a maximum value, said relay having two opposing coils of substantially the same field strength, one of which is in the circuit for said shunt field and the other of which is in said control circuit, and a resistance in series with said last-named coil to cause the amount of current flowing through said coil to be the same as the current flowing through said shunt field when said shunt field current is at its maximum value.

13. In a motor control system, a motor including an armature and shunt and series field windings, a main line circuit leading to said motor including a positive and negative conductor, a resistance in said circuit, a manually operable controller for cutting a part of said resistance from said circuit, and an automatic control circuit for cutting the rest of said resistance from said motor circuit when the shunt field current has reached its maximum value, said control circuit including a contactor adapted to cut said resistance into or out of said motor circuit and having its operating coil in said control circuit, a relay having its operating coil in series with said motor and adapted to break the control circuit to the operating coil of said contactor upon breaking of the power circuit to said motor, and another relay adapted to prevent regenerative voltage of said motor from operating said contactor and to prevent said remainder of said resistance from being cut into said motor circuit until the current flowing through said shunt field has reached a predetermined value, said relay being operable due to the transformer effect between said series and shunt fields.

14. In a motor control system, a motor including an armature and shunt and series field windings, a main line circuit leading to said motor including a positive and negative conductor, a resistance in said circuit, a manually operable controller for cutting a part of said resistance from said circuit, and an automatic control circuit for cutting the rest of said resistance from said motor circuit when the shunt field current has reached its maximum value, said control circuit including a contactor adapted to cut said resistance into or out of said motor circuit and having its operating coil in said control circuit, a relay having its operating coil in series with said motor and adapted to break the control circuit to the operating coil of said contactor upon breakage of the power circuit to said motor, and another relay operable due to the transformer effect between said series and shunt fields and adapted to prevent regenerative voltage of said motor from operating said contactor and to hold said remainer of said resistance into the motor circuit until said motor has gained the required speed and the current flowing through said shunt field has reaches a maximum value, said last-mentioned relay having two opposing coils of substantially the same field strength, one of which is in the circuit for said shunt field and the other of which is in said control circuit.

15. In a motor control system, a motor including an armature and shunt and series field windings, a main line circuit leading to said motor including a positive and negative conductor, a resistance in said circuit, a manually operable controller for cutting a part of said resistance from said circuit, and an automatic control circuit for cutting the rest of said resistance from said motor circuit when the shunt field current has reached its maximum value, said control circuit including a contactor adapted to cut said resistance into or out of said motor circuit and having its operating coil in said control circuit, a relay having its operating coil in series with said motor and adapted to break the control circuit to the operating coil of said contactor upon breakage of the power circuit to said motor, and another relay operable due to the transformer effect between said series and shunt fields and adapted to prevent regenerative voltage of said motor from operating said contactor and to hold said remainder of said resistance into the motor circuit until said motor has gained the required speed and the current flowing through said shunt field has reached a maximum value, said last-mentioned relay having two opposing coils of substantially the same field strength, one of which is in the circuit for said shunt field and the other of which is in said control circuit, and a resistance in series with said last-named coil to cause the amount of current flowing through said coil to be the same as the current flowing through said shunt field when said shunt field current is at its maximum value.

WILLIAM W. SLOANE.